United States Patent [19]

Hart et al.

[11] Patent Number: 4,961,798

[45] Date of Patent: Oct. 9, 1990

[54] SLEEVE APPLICATOR ASSEMBLY FOR PIPE JOINTS

[75] Inventors: Milburn L. Hart; Ronald E. Carlson, Sr., both of Tulsa, Okla.

[73] Assignee: Commercial Resins Company, Tulsa, Okla.

[21] Appl. No.: 415,581

[22] Filed: Oct. 2, 1989

[51] Int. Cl.$^5$ ............................................. B29C 27/28
[52] U.S. Cl. ...................................... 156/86; 156/392; 156/499
[58] Field of Search ........................... 156/86, 392, 499

[56] References Cited

U.S. PATENT DOCUMENTS

| | | | |
|---|---|---|---|
| 3,470,057 | 9/1969 | Stuart et al. | 156/392 |
| 3,547,731 | 12/1970 | Stuart et al. | 156/392 |
| 4,058,427 | 11/1977 | Wilson | 156/392 |
| 4,061,513 | 12/1977 | Danielson | 156/392 |
| 4,113,545 | 9/1978 | Stuart et al. | 156/392 |
| 4,125,422 | 11/1978 | Stuart et al. | 156/392 |
| 4,322,262 | 3/1982 | Cottam | 156/392 |

FOREIGN PATENT DOCUMENTS 59-188410  10/1984  Japan .................................. 156/392

*Primary Examiner*—David Simmons
*Attorney, Agent, or Firm*—William S. Dorman

[57] ABSTRACT

A system for first heating a section of pipe and then wrapping a sheet of heat-shrinkable material around the pipe to cover the section, the heat-shrinkable material having an outer polyethylene side and an inner mastic side which goes against the pipe, the mastic side forming a mechanical bond to the pipe when heated and having a lower melt temperature than the shrink temperature of the material, comprising arranging a plurality of induction coil assemblies in spaced relation around the pipe section, the induction coil assemblies having relatively arcuate induction coils therein, mounting the coils on a rotation fixture to form an arcuate surface adjacent to and parallel with the surface of the pipe, locating a heater assembly on the rotatable fixture between a pair of induction coil assemblies, rotating the rotatable fixture around the pipe section to heat the pipe section to the melt temperature of the mastic, wrapping a sheet of heat-shrinkable material around the pipe to form a sleeve with overlapping ends, placing a closure patch having a lower mastic surface over the overlapping ends of the sleeve, activating the heater assembly to bond the closure patch to the overlapping ends of the sleeve, and thereafter rotating the rotatable fixture while simultaneously applying a alternating electric potential to the induction coil assemblies to heat the pipe to a relatively higher shrink temperature thereby shrinking the applied sleeve.

8 Claims, 5 Drawing Sheets

SLEEVE APPLICATOR ASSEMBLY FOR PIPE JOINTS

BACKGROUND OF THE INVENTION

1. Field of the Invention

The present invention relates to a system for coating or covering weld joints in a pipeline. More particularly, the present invention relates to an assembly and process for applying and heating a sheet of heat-shrinkable material which is wrapped around a pipe to form a sleeve used to cover the weld joints in a pipeline.

2. Prior Art

Various methods and systems are used to cover the weld joints of a pipeline which has been made up from pipe sections welded together in end-to-end relation. These pipe sections have been previously coated at the mill, except for the ends, which as indicated above, are welded together in the field. The pipe joints are then protected from corrosion by coating them in the field with an epoxy material, or with a polyethylene material, or by covering these weld joints with asphalt sleeves or heat-shrinkable polyethylene sleeves.

The heat-shrinkable sleeves (sometimes referred to as "shrink sleeves") are generally formed from sheets of heat-shrinkable material which are pre-cut to the desired pipe diameter for forming a sleeve and to provide for a manufacturer's suggested overlap. The sheets of heat-shrinkable material (generally provided in the form of rolls) comprise an outer polyethylene side and an inner mastic side which goes against the pipe. The current method of applying shrinkable sleeves to a pipe weld joint includes the steps of cleaning the weld joint and then manually wrapping the pre-cut sheet (or tape, as it is sometimes called) around the pipe over the weld joint so that the ends overlap approximately six inches; then, a non-shrinkable patch is tacked over the sleeve ends by heating it with a blow torch; next, the weld joint is heated with the blow torch and the sleeve is centered over the weld joint; next, the above blow torch is used to heat the sleeve until shrinking is completed; and finally, a small hand roller is run over the sleeve area to push out any trapped air.

Searches were conducted on the present invention and the following patents represent the results of the searches:

| U.S. Pat. No. | Patentee | Issue Date |
| --- | --- | --- |
| 4,637,199 | Streck et al | January 26, 1987 |
| 4,595,607 | Betteridge et al | June 17, 1986 |
| 4,502,905 | Jung et al | March 5, 1985 |
| 4,261,785 | Hunter | April 14, 1981 |
| 4,533,419 | Pieslak et al. | Aug. 6, 1985 |
| 4,113,545 | Stuart Jr. et al. | Sept. 12, 1978 |
| 3,697,354 | Brown et al | October 10, 1972 |
| 3,547,731 | Stuart Jr. et al. | Dec. 15, 1970 |
| 3,470,057 | Stuart Jr. et al. | Sept. 30, 1969 |
| 4,322,262 | Cottam | March 30, 1982 |
| 3,994,766 | Dedels | Nov. 30, 1976 |
| 3,426,118 | Chapman et al. | Nov. 17, 1964 |
| 3,499,817 | Haven et al. | March 10, 1970 |
| 3,776,803 | Kissell | Dec. 4, 1973 |

The Betteridge et al patent is similar only with respect to the use of a rotating ring to induction heat the pipe. The present application differs mechanically by the use of a roller together with means to guide a pre-cut length of heat-shrinkable material onto the pipe, and an external radiant heater to set a closure patch. The present application also differs in that applicants are applying a completely different material by a different procedure and apparatus.

A pipe wrapping machine having a circumferential yoke that engages a section of pipe is disclosed in U.S. Pat. No. 3,470,057 to Stuart Jr. et al. The Stuart machine comprises a frame which is manually rotated about the pipe as it wraps a protective strip of material over a pipe joint in a helical manner. The above apparatus has an overhead gas heating chamber by which the adhesive side of the material is fed across the chamber to provide direct contact to melt the adhesive immediately prior to application to the pipe. Although the Stuart, Jr. patent is intended to wrap a short length of pipe (e.g. a weld area), it is designed to spiral wrap, not to wrap and provide a method to join the overlapping ends of the wrap. Further, the means of heating employed by Stuart is of no use for the purposes of the present invention. The heat-shrinkable tape employed in the present application is a two-layer product consisting of an internal low-melt mastic and an external higher-temperature shrinkable material, If one were to attempt to use the teachings of Stuart et al to apply the heat-shrinkable tape employed in the present invention, one of two undesirable results would occur: (1) If the operator successfully melted the mastic, it would deposit on the heater itself, and either cool between heater and pipe, or cool upon contact with the pipe (allowing no flow). (2) If the operator were able to bring the sheet or tape (outer layer) to shrink temperature, the mastic would run off the sheet, the sheet would shrink prematurely, and since it has little capacity to retain latent heat, would stop shrinking between heater and pipe, and would certainly stop shrinking upon contact with the cold pipe. (It should be remembered that proper or full shrinkage requires maintaining temperature over a period of time—maybe 30 seconds.)

A similar portable joint wrapping machine is disclosed in U.S. Pat. No. 3,547,731 to Stuart Jr. et al. The variation in this apparatus of Stuart's includes a bowed roller for compensation of the differences in pipe diameters. The adhesive of the wrapping material is melted by direct application of the flame of a handheld propane torch.

A third circumferentially engagable pipe wrapping machine is disclosed in U.S. Pat. No. 4,113,545 to Stuart Jr. et al. This apparatus comprises another manually operated frame for the application of a cold wrap coating material.

In U.S. Pat. No. 3,994,766 to Dedels, a very large pipe cleaning and wrapping machine is disclosed. The Dedels device includes a superstructure disposed about the pipe and an adjacent tracked vehicle. The patent to Dedels is typical of over-the-ditch wrapping machines which are designed to clean and wrap cold-applied tapes on a continuous run. This patent is relevant only in showing that taping pipes is a standard practice.

U.S. Pat. No. 4,261,785 to Hunter is similar to Dedels, discussed above, in that it is typical of over-the-ditch wrapping machines which are designed to clean and wrap cold-applied tapes on a continuous run. In addition, this patent shows a conventional ring gear means for rotating a fixture.

U.S. Pat. No. 4,533,419 to Pieslak et al. discloses the standard method for the application of a patch closure using a blow torch.

U.S. Pat. No. 3,776,803 to Kissell is pertinent in that it applies a heat shrinkable material in the form of a sleeve to a duct. The sleeve is preformed, and as such, must be slid over the pipe. This precludes its use for pipeline application. Secondly, the whole apparatus is designed to rotate the pipe. Thirdly, all heat is externally applied, which would result on poor flow of mastic, especially without a roller. However, Kissell does discuss some of the well known characteristics of heat-shrinkable films.

U.S. Pat. No. 4,502,905 to Jung et al shows a conventional ring gear means for rotating a fixture.

U.S. Pat. No. 3,697,354 to Brown et al shows a pneumatic biasing means for a stay fusing machine.

U.S. Pat. No. 4,637,199 shows an eliptical coil in a machine for sealing paperboard packaging material.

No prior art device discloses a relatively compact motor driven machine for the application of a heat-shrinkable sleeve that can be readily operated by two persons. No prior art machine discloses a single system comprising both induction and radiant heat for the purpose of preheating the pipe prior to the application of the heat-shrinkable material which forms the sleeve. No prior art apparatus provides a single device and process for first the application of the heat-shrinkable material in the form of a sleeve and then the shrinking of the sleeve by heating in accordance with manufacturer's specifications.

The state of the art in heat-shrinkable sleeve application for girth welds is two men with torches. The present machine improves the uniformity, repeatability and quality of the coating, while increasing the speed and eliminating a man. Although some of the prior art patents might have some general similarities with respect to specific sub-components of the overall machine, these prior art machines are not capable of, or designed to, handle the product.

SUMMARY OF THE INVENTION

An object of the present invention is to provide an improved apparatus and process for applying a shinkable sleeve to pipe weld joints. Another object of the present invention is to provide an applicator combined with means for preheating the pipe thereby eliminating the use of a blow torch. A further object of the present invention is to provide a single mechanical unit for applying and shrinking a coating sleeve, thereby eliminating the necessity of multiple manual application techniques.

It should be understood that a sleeve is not actually formed as such until the heat-shrinkable sheet is wrapped on the pipe by the rotatable fixture; thus, the heat-shrinkable material in the form of a sheet is applied to the pipe in such manner that it becomes a sleeve when wrapped on the pipe by the fixture; the so-wrapped sleeve is then shrunk around the pipe or pipe joint.

The present invention provides an apparatus for first heating and then applying a sheet of heat-shrinkable material around the weld joints of a pipeline which has been made up from pipe sections welded together in end-to-end relation. These pipe sections have been previously coated at the mill, except for the ends, which as indicated above, are welded together in the field. The apparatus of the present invention includes a stationary frame of the type used in a standard pipe beveling machine and a rotating frame or fixture whose forward portion is attached to the stationary frame and whose rear portion, or ring, circumferentially engages a section of pipeline to support the fixture. The central area of the rotating fixture includes a radiant heater assembly and a pair of induction coil assemblies. The induction coil assemblies disclosed herein provide an induction heating system which is broadly similar, in principle, to that shown in Betteridge et al U.S. Pat. No. 4,595,607 issued on Jun. 17, 1986 to an affiliated company on an invention entitled "Combined Heating and Coating System for Pipe Weld Joints"; however, the induction heating system in the aforementioned patent is designed for a different end result. The stationary frame is provided with a motor and means for rotating the fixture 360° about the pipe.

The central area of the rotating fixture of the present invention comprises a plurality of beams affixed to its forward portion extending longitudinally therefrom and having their rear ends attached to the rear ring which circumferentially engages a section of the pipe. The radiant heater assembly is affixed to the uppermost beams and is disposed directly above a previously cleaned weld joint. The two induction coil assemblies are affixed to beams along sides of the rotating fixture opposite from each other. Each induction coil assembly includes an elliptically wound copper coil which is disposed longitudinally parallel to the pipe and which is bowed to match the curvature thereof. The coils which form the induction heaters are hollow so that water can pass through thereby cooling them. An electrical current is allowed to pass through the coils which are sufficiently electrically insulated from the rest of the assembly. For the purpose of example, the frequency of the electric current is preferably 800 cycles (hertz) and the power source should be capable of delivering about 750 amperes of current.

The radiant heater assembly includes a retention area or box for holding a pre-cut sheet of heat-shrinkable material (which later forms the sleeve) and a radiant heater disposed directly below the box. Two adjustable guides are mounted on the central portion of one of the beams adjacent the radiant heater. A silicon roller is rotatably mounted on suitable means adjacent the heater and is provided with pneumatic means for raising and lowering the roller to contact the surface of the pipe. The main frame of the assembly, which includes the stationary forward frame and the rotating fixture, is essentially made of aluminum. The induction coil assemblies are attached to the rotating frame by means of phenolic (or equivalent) tabs and bars which are electrically non-conductive and non-magnetic.

It is preferable to preheat the pipe either by the use of the radiant heater or the induction coils depending on the melt and shrink temperature of the material to be applied to the weld joint. The desired heating apparatus is activated and the fixture is rotated a full turn to preheat the pipe.

The leading end of the heat-shrinkable sheet is fed between the two guides and the silicon roller is lowered so that the operator can press the end of the sheet down against the surface of the pipe. The fixture is rotated and the silicon roller forces the sheet to contact the preheated surface of the pipe thereby melting the mastic which creates a mechanical bond to the surface of the pipe. A portion of a closure patch is tacked to the trailing end of the resulting sleeve to provide a temporary joint for the overlap area of the sleeve.

The roller provides a means for applying the sleeve and patch, and serves to greatly reduce the amount of air trapped beneath the sleeve. After the sleeve has been applied, the roller is raised and the fixture is rotated to bring the radiant heater directly over the patch. The radiant heater is activated to melt the mastic of the patch and the roller is lowered to essentially "iron" the patch onto the overlap portion of the sleeve.

To shrink the sleeve, the roller is raised and the induction coils are activated to the higher specified shrink temperature. The fixture is again rotated as the induction coils shrink the sleeve.

BRIEF DESCRIPTION OF THE DRAWINGS

FIG. 6 is a cross-sectional view taken along section line 6—6 of FIG. 2.

DETAILED DESCRIPTION OF THE PREFERRED EMBODIMENTS

Figure 1:
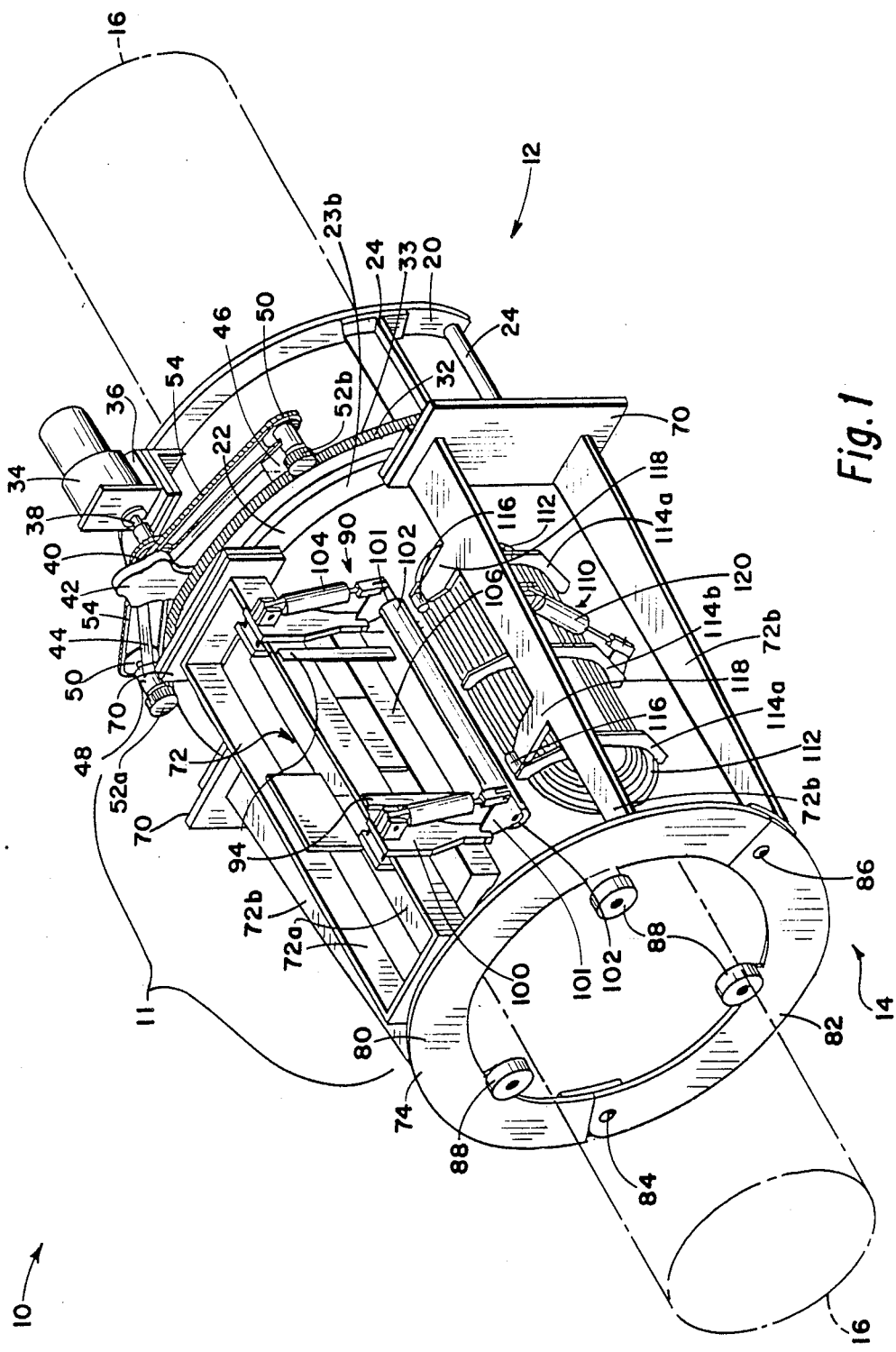
FIG. 1 is an isometric view of the applicator assembly of the present invention being shown in engagement with a section of pipeline.
Figure 2:
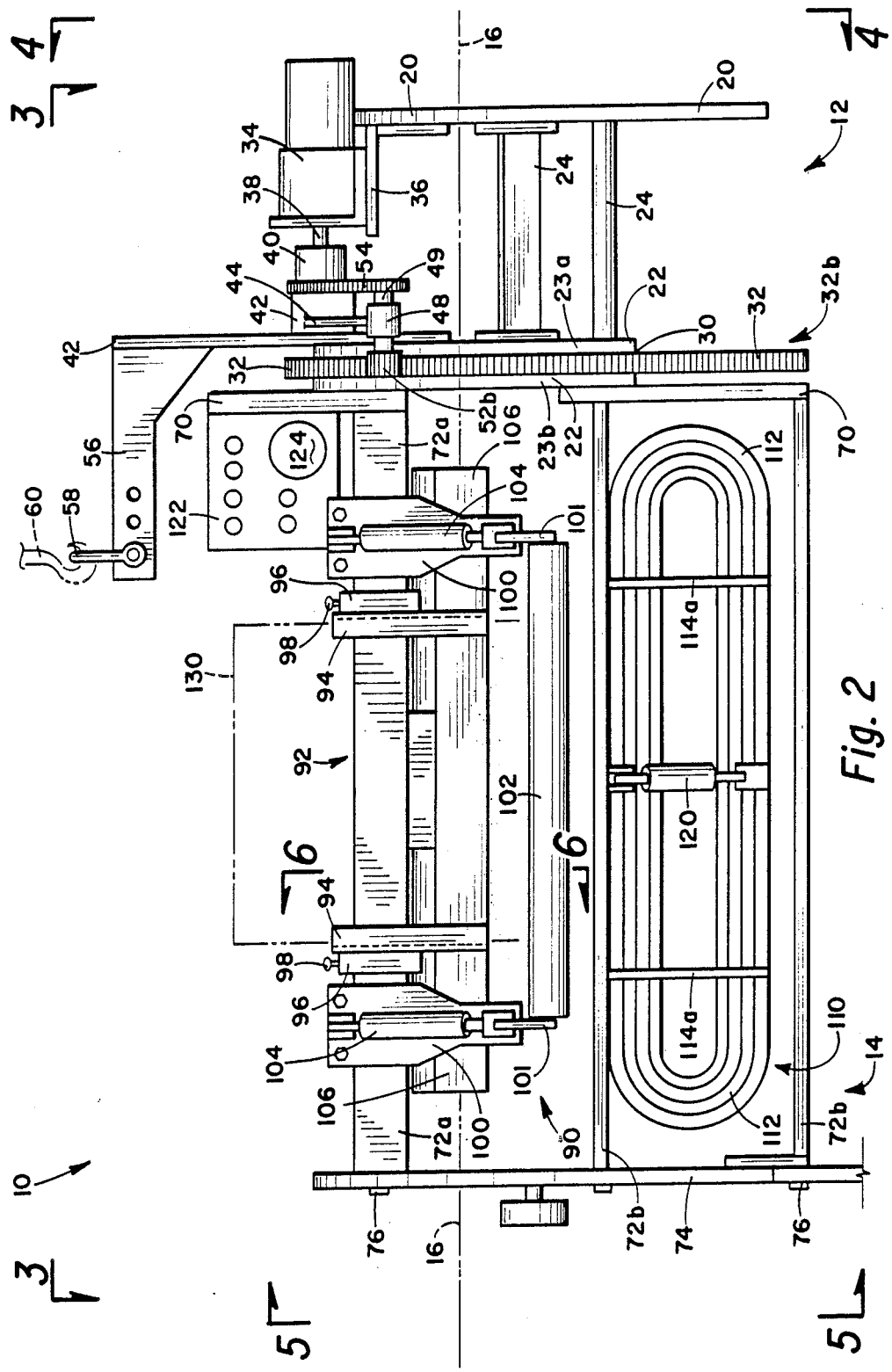
FIG. 2 is a side elevational view of the present invention.
Figure 3:
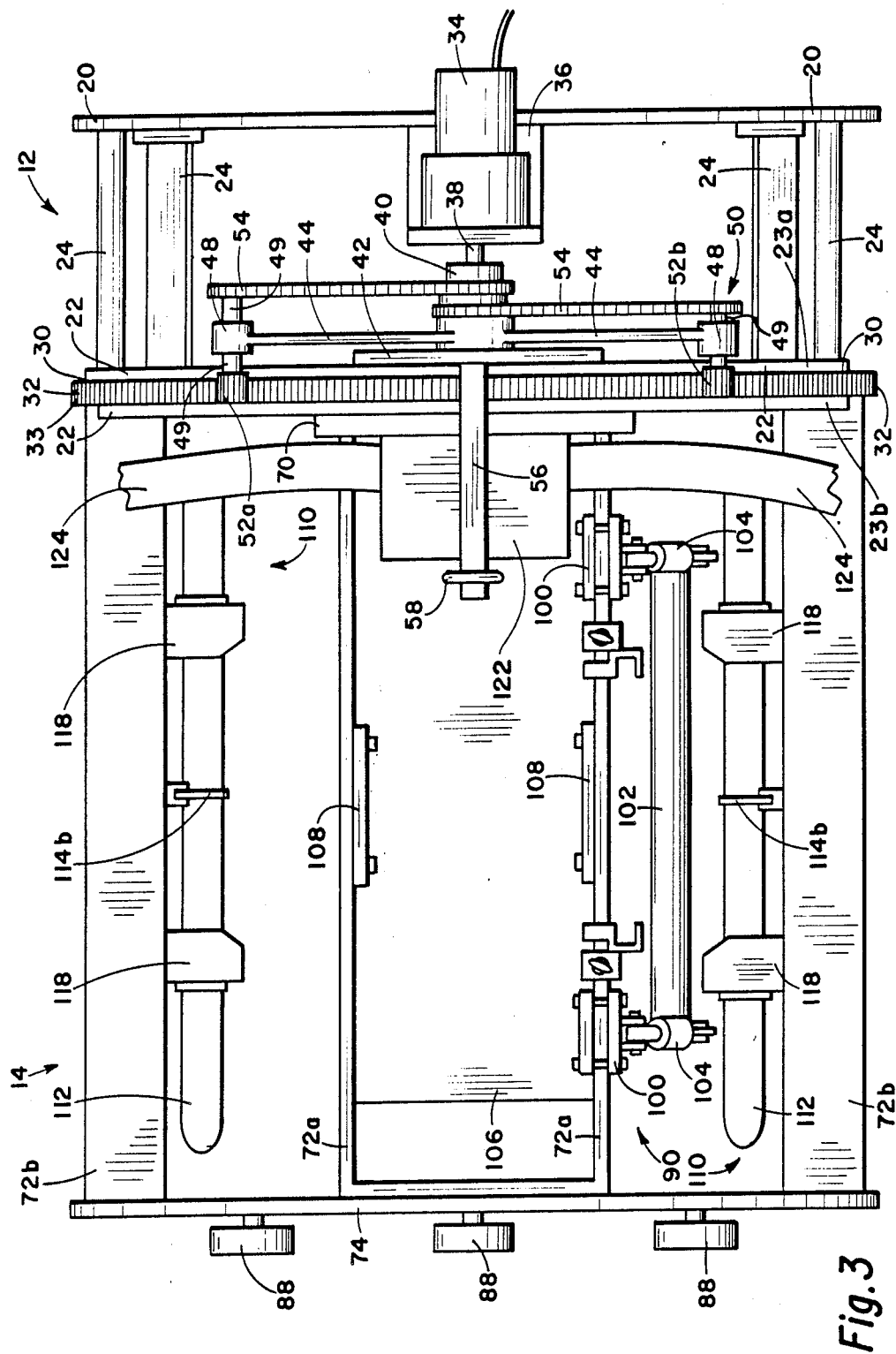
FIG. 3 is a top plan view of the present invention taken along line 3—3 of FIG. 2.

Referring to the drawings in detail, FIGS. 1 through 3 show an applicator assembly 10 which consists of a stationary frame 12 and a rotatable fixture 14. As will be disclosed in greater detail hereinafter, the assembly 10 is constructed to engage a section of pipe 16 so that a central area 11 of assembly 10 is disposed above the weld joint (not shown).

Figure 4:
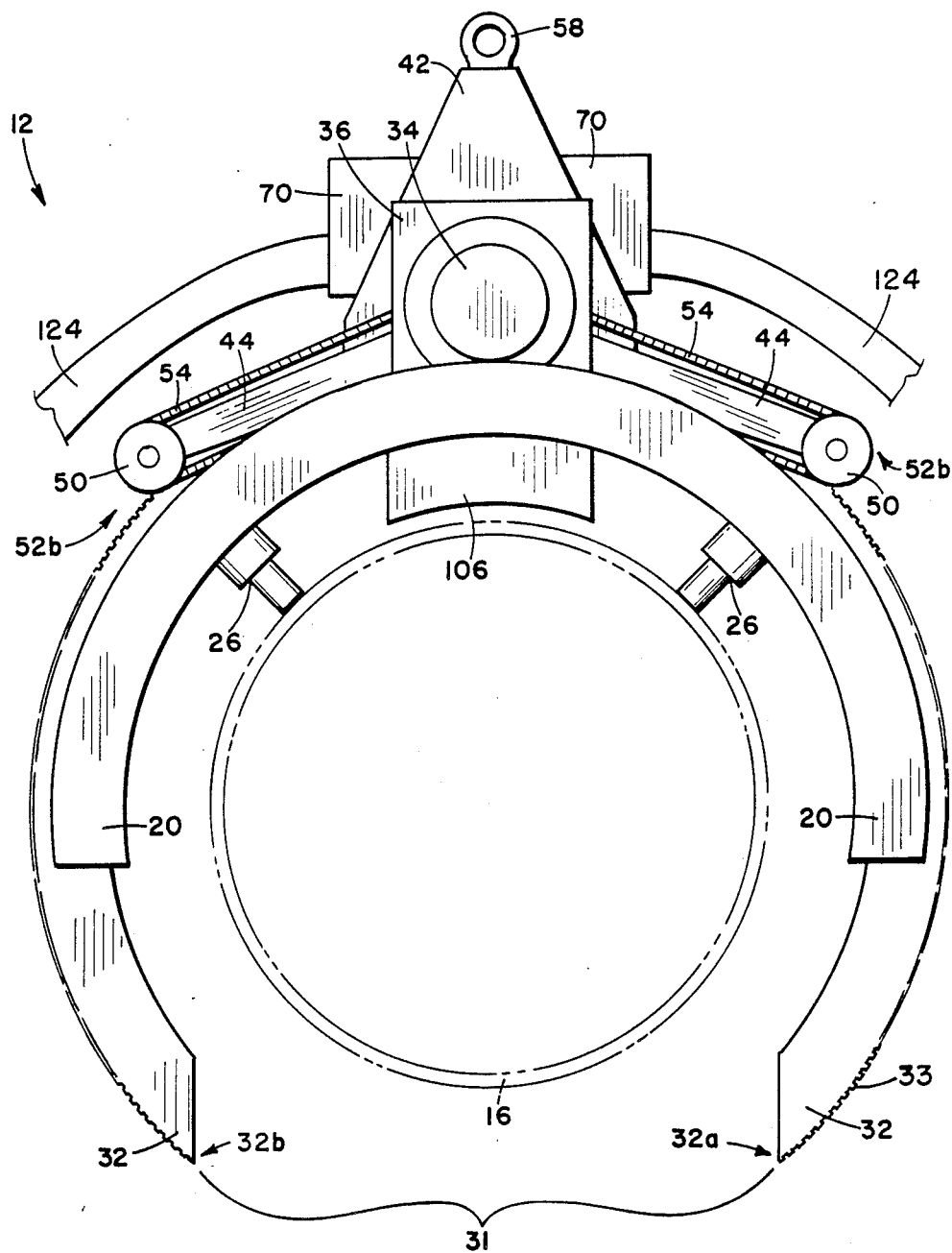
FIG. 4 is a front elevational view taken along line 4—4 of FIG. 2.

The stationary frame 12 is essentially a standard aluminum pipe beveling machine having a forward arcuate yoke 20 and a rear arcuate yoke 22 joined in a spaced parallel relationship by means of rods or cross bars 24. As shown in FIG. 4, yokes 20 and 22 each have been provided with a pair of supports or legs 26, having padded lower ends, which rest on the surface of pipe 16. Rear yoke 22 comprises a pair of arcuate plates or flanges 23a and 23b bolted together to provide an arcuate slot 30 therebetween for receiving a split ring gear 32. Plates 23a and 23b are fastened together by the bolts (not shown along the inner curvature so as to be closely adjacent the surface of pipe 16. The ring gear 32 will freely travel or ride in slot 30 along the outer curvature of rear yoke 22.

Stationary frame 12 provides the rotating system of the rotatable fixture 14 which comprises a drive motor 34 affixed to a mounting angle 36 which is attached to the upper portion of the front yoke 20. A drive shaft 38 extends rearwardly from motor 34 having a double sprocket or pulley 40 mounted on its end and which is rotatably mounted on a mounting bracket or attachment plate 42. The mounting bracket is provided with a pair of angled members 44 extending from the opposite sides of bracket 42 and which are each reinforced by braces 46 at their lower ends (see FIGS. 2 and 3), and which are used for mounting a pair of axle sleeves 48.

An axle sleeve 48 is mounted on the ends of each member 44 for receiving an axle 49; a sprocket or pulley 50 is mounted on the forward end of each axle and a small drive gear 52 is affixed to the rear end of each axle which engages the large gear 32. Each sprocket or pulley is drivingly connected to sprocket 40 by means of its respective chain or endless belt 54. The upper portion of bracket 42 is provided with a lifting means or hook assembly 56 having an eye 58, which can be connected to a hook 60 for the purpose of lifting the assembly 10 from around the pipe 16.

Figure 5:
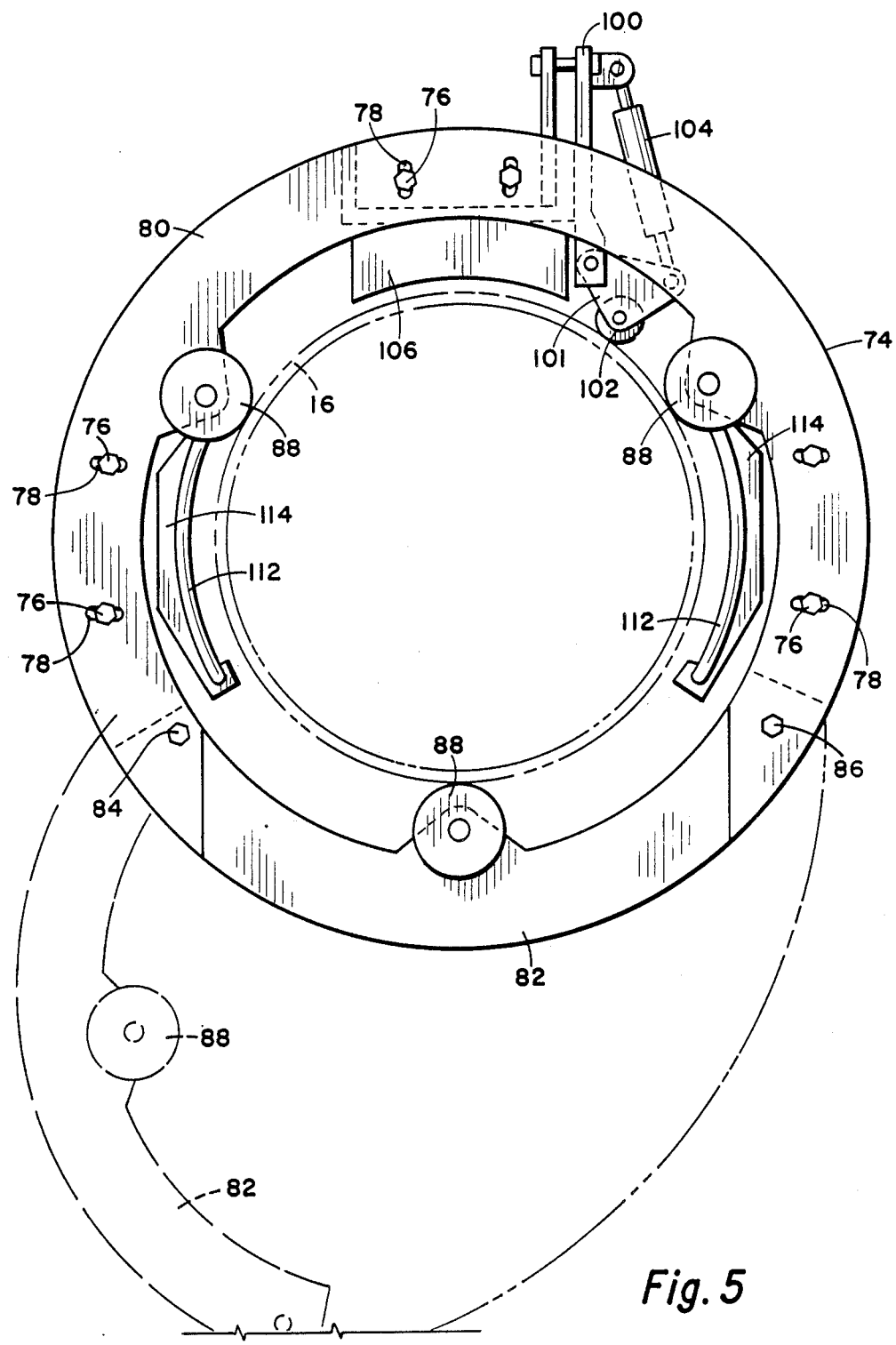
FIG. 5 is rear elevational view taken along line 5—5 of FIG. 2.

The rotatable fixture 14 of the present invention comprises a plurality of mounting plates 70 having a pluralty of mounting ribs or beams 72 extending longitudinally rearward therefrom. Mounting beams 72 include an upper plurality of beams 72a and a plurality of side beams 72b. A rear support ring 74 is attached to the ends of beams 72 by means of bolts 76 which pass through a plurality of adjustment slots 78 in ring 74 (see FIG. 5). The rear ring 74 circumferentially engages the pipe 16 and comprises on upper arcuate section 80 and a smaller lower arcuate section 82 which is pivotally connected to the upper section at a point 84. As shown in FIG. 5, the lower section 82 is secured to upper section 80 by means of a bolt or pin 86; and is adapted to pivot and swing away from the upper section by removal of pin 86, thereby allowing removal of the assembly 10 from engagement with the pipe 16. Ring 74 is also provided with a plurality of idler or support wheels 88 which axially support the ring and thereby the rearward section of assembly 10.

The mounting plates 70 are affixed to the split ring gear 32. Although not shown, the mounting plates could be replaced by a single arcuate upper section having a pivotally connected arcuate lower section thereby forming a forward mounting ring essentially identical to the rear supporting 74. However, this forward mounting ring would not need support wheels since it would be affixed to ring gear 32. As shown in FIG. 4, the ring gear has a toothed outer surface 33 which engages the teeth or cogs on a right and left small drive gear (right) 52a and (left) 52b. The split ring gear is also provided with an opening 31 allowing the apparatus 12 to be mounted on pipe 16, and a right lower end 32a and a left lower end 32b. The two small drive gears are spaced farther apart than the opening 31 in the lower portion of ring gear 32 which allows for a full 360° rotating of fixture 14.

When motor 34 is actuated, it turns sprocket 40 which subsequently drives the gears 52 by means of belts 54 thereby turning the large ring 32. As the ring travels or rotates in the slot 30, rotating the fixture 14 clockwise (for example), the right lower end 32a of gear 32 will feed or enter directly into the slot 30 and will contact the left drive gear 52b before the left lower end 31b disengages from the right drive gear 52a. The fixture 14 can be rotated in either a clockwise or counterclockwise direction.

Referring again to FIGS. 1 through 3, fixture 14 is provided with a heater assembly 90 which is affixed to the uppermost beams 72a and extends downwardly therefrom. Heater assembly 90 comprises a retention box or area 92 which is essentially formed by beams 72a and a pair of sheet guides 94 slidably mounted on one of beam 72a. The guides 94 can be moved closer together or farther apart by means of attached adjustment blocks 96 and thumbscrews 98. A pair of roller mounting brackets 100 are affixed to the same beam 72a outside and adjacent to the sheet guides 94. A silicon roller 102 is rotatably mounted on the lower end portions 101 of brackets 100. The roller 102 can be raised and lowered by means of pneumatic cylinders 104. A radiant heater 106 is disposed directly beneath retention area 92 and is mounted on beams 72a by suitable means such as plates 108.

As shown in FIGS. 1 through 3 and 5, the rotatable fixture 14 is also provided with two essentially identical induction coil assemblies 110 which are pivotally connected by suitable means to the side beams 72b. Induction coil assembly 110 includes an induction coil 112 comprising a length of hollow copper tubing wound in an elliptical pattern a multiple number of times. As best shown in FIG. 5, coil 112 is bowed or curved to correspond to the curvature of the pipe 16. The outer surface of the coil 112 has been covered with an insulating material such as resin or fiberglass and resin (not shown) and is affixed to a plurality of phenolic bars 114 (comprising two outermost bars 114a and a central bar 114b). As shown, the two outermost phenolic bars 114a are pivotally connected to a hinge 116 (also phenolic) on the ends of inwardly disposed extensions 118 of side beams 72b. The central bar 114b is connected by means of a phenolic tab 119 to a pneumatic cylinder 120, pivotally connected to a portion of side beam 72b, which provides means for moving induction coil 112 closer or farther away from the outer surface of pipe 16. The phenolic fixtures provide a means for electrically isolating the induction coils from the metal of the assembly 10. Therefore the term "phenolic" should be understood as any suitable electrically non-conductive material.

The adjustment slots 78 on rear ring 74 and the pneumatic cylinders 120 on the induction coils 112 provide the means whereby the applicator assembly 10 can be used on various pipe diameter in a given range, i.e. 12-16 inch O.D. Pneumatic cylinders 120 also allow for easier disengagment of assembly 10 from the pipe.

As shown in FIGS. 2-4, the assembly 10 also includes a power box 122, which includes the controls for the assembly, power lines and the water lines 124 for cooling the induction coil assemblies 110. The power box could also include temperature reading capabilities (not shown).

THE OPERATION

Before the operation of the applicator assembly 10, the weld joint to be covered is cleaned. Assembly 10 is operated by two persons and is brought over the pipe 16 so that radiant heater 106 will be disposed directly over the weld joint and the entire assembly is lowered onto the pipe 16. The lower arcuate section 82 of rear ring 74 is secured by pin 86 to the upper arcuate section 80.

It is generally preferable for the pipe joint to be preheated prior to the application of the heat-shrinkable sheet material. The material comes in rolls from which pieces or sheets can be pre-cut to a desired length to provide the recommended amount of overlap prior to shrinking. The material comprises an outer polyethylene side and a mastic polymer side which goes against the pipe 16. The mastic surface forms a mechanical bond when heated and has a lower melt temperature than the shrink temperature of the material. There are a variety of heat-shrinkable materials having different ranges of melt and shrink temperature. For material having a relatively low shrink temperature it is preferable to use the radiant heater to preheat the weld joint; the induction coils are used to preheat the weld joint for the application of higher temperature shrink materials. One suitable heat-shrinkable material which applicants have used successfully in the present process is sold by Raychem Corporation of Menlo Park, Calif., under the product designation "WPC/110".

The radiant heater or the induction coils are actuated and fixture 14 is rotated one 360° pass to preheat the weld joint. As shown in FIG. 6, a pre-cut sheet of 130 of heat-shrinkable material is placed in the retention area 92 and is fed between guides 94. Roller 102 is lowered to contact the surface of pipe 16 and an operator feeds the leading end of sheet 130 onto the pipe. As the fixture 14 is rotated, the sheet is fed onto the pipe by means of the silicon roller. The mastic surface contacts the preheated weld joint and is melted and mechanically fused to the pipe surface. The silicon roller 102 also provides means for greatly reducing the amount of air trap beneath the sleeve.

A temporary joint is provided by means of a non-shrinkable polyethylene closure patch (not shown) having a lower mastic surface. The patch is also provided with contact strips to be tacked onto the sleeve and is inserted between guides 94 to cover and join the overlapping ends of the sleeve. The roller is raised and the fixture 14 is returned to a position where the radiant heater is disposed directly over the closure patch. The radiant heater is actuated to melt the mastic on the patch and the roller is lowered onto the patch. The fixture is rotated slightly to essentially allow roller 102 to press down or "iron" the patch on to the overlapping ends as its mastic is being melted. The roller is raised and the induction coils 112 are activated to provide a shrink heating as the fixture is rotated a sufficient number of times to shrink the sleeve. For example, a precut sheet may produce a sleeve having a 7 inch overlap of the ends prior to shrinking and after the shrinking operation have an overlap of 4 inches. The assembly 10 is now ready to be removed from the completed section of pipe and moved onto the next weld joint.

Whereas, the present invention has been described in particular relation to the drawings attached hereto, other and further modifications, apart from those shown or suggested herein, may be made within the spirit and scope of this invention.

What is claimed is:

1. An apparatus for first heating a section of pipe and then wrapping a sheet of heat-shrinkable material around the pipe to cover said section, the heat-shrinkable material having an outer polyethylene side and an inner mastic side which goes against the pipe, the mastic side forming a mechanical bond to the pipe when heated and having a lower melt temperature than the shrink temperature of the material, the apparatus comprising an assembly adapted for circumferentially engaging said pipe, said assembly having an arcuate stationary frame and a rotatable fixture affixed to a portion of said frame and extending longitudinally therefrom, rotating means mounted on said frame for rotating said fixture in either direction around said pipe, a plurality of induction coil assemblies mounted spacedly on said fixture and being disposed longitudinally parallel to said pipe, whereby said fixture can be rotated around said pipe while simultaneously activating said coil assemblies to heat said pipe to the melt temperature of the mastic, a heater assembly mounted on said fixture between a pair of said induction coil assemblies so as to be disposed directly above said section of said pipe for applying said sheet of heat-shrinkable material to said pipe immediately following the heating to said melt temperature, said heater assembly having guiding means for feeding said sheet onto the surface of said heated section and for forming a sleeve with overlapping ends as said fixture rotates around the pipe, said heater assembly having a lower temperature heater for joining the overlapping ends of said sleeve immediately following its formation; whereby the fixture can be rotated around said pipe while simultaneously activating said coil assemblies to heat said pipe to a higher shrink temperature thereby shrinking the sleeve.

2. An apparatus as set forth in claim 1 wherein said rotating means mounted on said frame comprises a split ring gear being received in an arcuate slot adjacent said fixture, said fixture being affixed to said ring gear, a motor mounted on another portion of said frame for driving a sprocket, said sprocket being disposed adjacent said ring gear and being connected by means of belts to a pair of small drive gears, said drive gears operationally connected to said ring gear on opposite sides; whereby activating said motor rotates said sprocket subsequently rotating said drive gears thereby rotating said ring gear and whereby said fixture is capable of being rotated about said pipe 360° in either direction.

3. An apparatus as set forth in claim 1 and being further characterized by means for axially supporting the end of said fixture opposite said frame about said pipe.

4. An apparatus as set forth in claim 3 wherein said means for axially supporting comprises a support ring mounted on the end of said fixture opposite said frame, said support ring adapted for circumferentially engaging said pipe and comprising an upper arcuate section and a lower arcuate section, said lower section pivotally connected to said upper section and being adapted to open and swing away from said upper section, and a plurality of support wheels rotatably mounted on said support ring for contacting the surface of said pipe.

5. An apparatus as set forth in claim 1 and being further characterized by a pair of induction coil assemblies mounted on opposite sides of said fixture and being disposed longitudinally parallel to said pipe, each said induction coil assembly having an induction coil mounted on said fixture by electrically non-conductive means, whereby applying an alternating electric potential to said induction coils generates heat, and pneumatic means for adjusting the distance between said induction coils and the surface of said pipe.

6. An apparatus as set forth in claim 5 wherein each said induction coil comprises a length of hollow copper tubing wound in an elliptical pattern a multiplicity of times, each said coil being bowed correspondingly to the curvature of said pipe, and an insulating material covering the outer surface of each said coil, whereby water can pass through said coils to keep them cool during any induction heating of said pipe.

7. An apparatus as set forth in claim 1 wherein said guiding means for the for feeding said sheet onto the surface of said heated section comprises a retention area disposed above said lower temperature heater for holding a heat-shrinkable sheet prior to feeding said sheet to said pipe, a pair of sheet guides slidably mounted on a portion of said heater assembly, means for horizontally adjusting said sheet guides, a roller rotatably mounted on the lower portion of said heater assembly for pressing down said sheet against the heated surface of said pipe, and pneumatic means for lowering said roller to contact the surface of said pipe.

8. A process for first heating a section of pipe and then wrapping a sheet of heat-shrinkable material around the pipe to cover said section, the heat-shrinkable material having an outer polyethylene side and an inner mastic side which goes against the pipe, the mastic side forming a mechanical bond to the pipe when heated and having a lower melt temperature than the shrink temperature of the material, comprising arranging a plurality of induction coil assemblies in spaced relation around said pipe section, said induction coil assemblies having relatively arcuate induction coils therein, mounting the coils on a rotatable fixture to form an arcuate surface adjacent to and parallel with the surface of the pipe, locating a heater assembly on the rotatable fixture between a pair of induction coil assemblies, rotating the rotatable fixture around the pipe section to heat the pipe section to the melt temperature of the mastic, wrapping a sheet of heat shrinkable material around the pipe to form a sleeve with overlapping ends, placing a closure patch having a lower mastic surface over the overlapping ends of the sleeve, activating said heater assembly to bond the closure patch to the overlapping ends of the sleeve, and thereafter rotating said rotatable fixture while simultaneously applying a alternating electric potential to said induction coil assemblies to heat the pipe to a relatively higher shrink temperature thereby shrinking the applied sleeve.

* * * * *